United States Patent
Son et al.

(10) Patent No.: US 8,182,964 B2
(45) Date of Patent: May 22, 2012

(54) ELECTRODE FOR FUEL CELL, MEMBRANE-ELECTRODE ASSEMBLY FOR FUEL CELL, AND FUEL CELL SYSTEM INCLUDING THE SAME

(75) Inventors: In-Hyuk Son, Yongin-si (KR); Ho-Jin Kweon, Yongin-si (KR); Sang-Il Han, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1217 days.

(21) Appl. No.: 11/711,603

(22) Filed: Feb. 28, 2007

(65) Prior Publication Data
US 2007/0259253 A1 Nov. 8, 2007

(30) Foreign Application Priority Data
Mar. 31, 2006 (KR) .................. 10-2006-0029411

(51) Int. Cl.
*H01M 4/02* (2006.01)

(52) U.S. Cl. ........ 429/529; 429/484; 429/492; 429/488; 429/530

(58) Field of Classification Search .................. 429/484, 429/492, 483, 529, 530
See application file for complete search history.

(56) References Cited

U.S. PATENT DOCUMENTS

| H2240 H | * | 5/2010 | Davis et al. .................. 429/530 |
| 2002/0192530 A1 | * | 12/2002 | Kabumoto et al. ............. 429/38 |
| 2004/0185325 A1 | * | 9/2004 | Faguy et al. ..................... 429/44 |
| 2005/0233186 A1 | * | 10/2005 | Ryoichi et al. .................. 429/13 |

* cited by examiner

*Primary Examiner* — Barbara Gilliam
*Assistant Examiner* — Zachary Best
(74) *Attorney, Agent, or Firm* — Christie, Parker & Hale, LLP

(57) ABSTRACT

A membrane-electrode assembly for a fuel cell of the present invention includes: an anode and a cathode facing each other; and a polymer electrolyte membrane interposed between the anode and the cathode. The anode and the cathode or both include an electrode substrate and a catalyst layer. The catalyst layer includes a catalyst, a hydrophilic ionomer, and a hydrophobic binder.

23 Claims, 2 Drawing Sheets

ELECTRODE FOR FUEL CELL, MEMBRANE-ELECTRODE ASSEMBLY FOR FUEL CELL, AND FUEL CELL SYSTEM INCLUDING THE SAME

CROSS-REFERENCE TO RELATED APPLICATIONS

This application claims the benefit of Korean Application No. 2006-29411, filed Mar. 31, 2006, in the Korean Intellectual Property Office, the disclosure of which is incorporated herein by reference.

BACKGROUND OF THE INVENTION

1. Field of the Invention

Aspects of the present invention relate to an electrode for a fuel cell, a membrane-electrode assembly for a fuel cell, and a fuel cell system including the same. More particularly, aspects of the present invention relate to an electrode for a fuel cell that will produce a fuel cell with high efficiency and high power because of high catalyst efficiency, as well as a membrane-electrode assembly for a fuel cell, and a fuel cell system including the same.

2. Description of the Related Art

A fuel cell is a power generation system for producing electrical energy through an electrochemical redox reaction of an oxidant and hydrogen in a hydrocarbon-based material such as natural gas or an alcohol such as methanol, ethanol, propanol or butanol.

Such a fuel cell is a clean energy source that may replace fossil fuels. It includes a stack composed of unit cells and produces various ranges of power output. Since it has a four to ten times higher energy density than a small lithium battery, it has been promoted as a small portable power source.

Representative exemplary fuel cells include a polymer electrolyte membrane fuel cell (PEMFC) and a direct oxidation fuel cell (DOFC). The direct oxidation fuel cell includes a direct methanol fuel cell, which uses methanol as a fuel.

The polymer electrolyte fuel cell has the advantage of a high energy density, but it also has problems in the need to carefully handle hydrogen gas and the requirement of accessory facilities such as a fuel reforming processor for reforming methane or methanol, natural gas, and the like in order to produce hydrogen as the fuel gas.

Conversely, a direct oxidation fuel cell has a lower energy density than that of the polymer electrolyte fuel cell, but it has the advantages of easy handling of the fuel, being capable of operating at room temperature because of its low operating temperature, and no need for additional fuel reforming processors.

In the above polymer electrolyte fuel cell, the stack that generates electricity generally includes several to scores of unit cells stacked in multiple layers, and each unit cell is formed of a membrane-electrode assembly (MEA) and a separator (also referred to as a bipolar plate). The membrane-electrode assembly has an anode (also referred to as a fuel electrode or an oxidation electrode) and a cathode (also referred to as an air electrode or a reduction electrode) attached to each other with an electrolyte membrane between them.

The fuel is supplied to the anode and absorbed in the anode catalyst, and the fuel is oxidized to produce protons and electrons. The electrons are transferred into the cathode via an external circuit, and the protons are transferred into the cathode through a polymer electrolyte membrane. An oxidant is supplied to the cathode, and the oxidant, protons, and electrons are reacted on a catalyst at the cathode to produce electricity along with water.

SUMMARY OF THE INVENTION

One embodiment of the present invention provides an electrode for a fuel cell having high efficiency and high power because of high catalyst efficiency.

Another embodiment of the present invention provides a membrane-electrode assembly including the electrode.

Yet another embodiment of the present invention provides a fuel cell system including the membrane-electrode assembly.

One embodiment of the present invention provides an electrode including an electrode substrate and a catalyst layer. The catalyst layer includes a catalyst, a hydrophilic ionomer, and a hydrophobic binder. The hydrophobic binder may be a non-electric conductive binder selected from the group consisting of polytetrafluoroethylene, polyvinylidene fluoride, and combinations thereof.

The hydrophilic ionomer may be a proton conductive polymer resin.

Another embodiment of the present invention provides a membrane-electrode assembly that includes an anode and a cathode facing each other and a polymer electrolyte membrane interposed between the anode and cathode. Either the anode or the cathode can have the structure of the embodiment described above. When both the anode and the cathode include the above electrode, cell power is maximized.

The above membrane-electrode assembly can be used in a direct oxidation fuel cell.

Yet another embodiment provides a fuel cell system including at least one electricity generating element that generates electrical energy through an electrochemical reaction of a fuel and an oxidant, a fuel supplier for supplying a fuel to the electricity generating element, and an oxidant supplier for supplying an oxidant to the electricity generating element.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
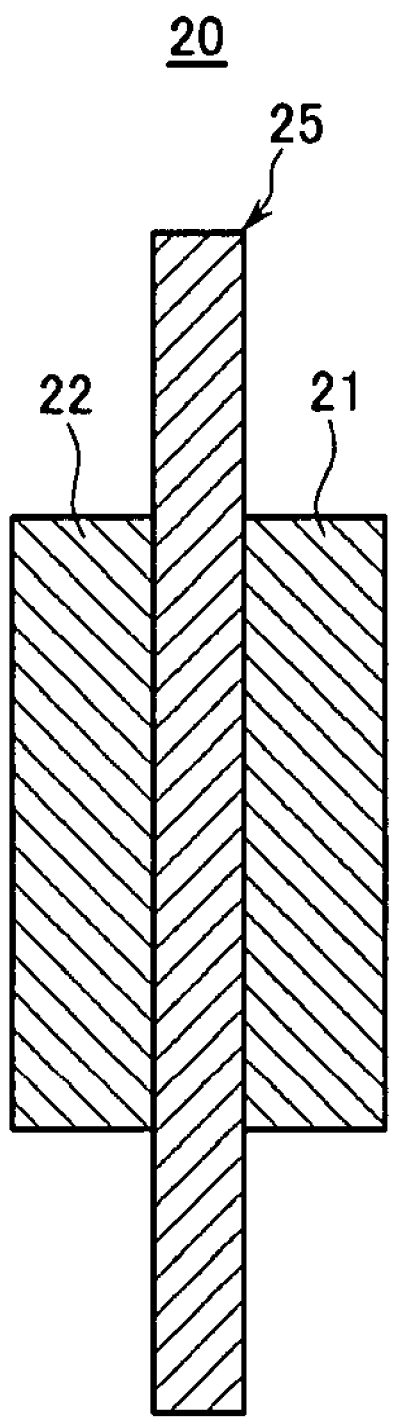
FIG. 1 is a schematic cross-sectional view showing a membrane-electrode assembly according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Aspects of the present invention relate to an electrode for a fuel cell, particularly the catalyst layer of the electrode. The catalyst layer affects performance of a membrane-electrode assembly as well as the membrane electrode assembly's electrochemical characteristics since the catalyst layer is the main factor affecting mass transfer.

According to one embodiment, the catalyst layer structure is optimized to improve performance of a membrane-electrode assembly.

The electrode according to one embodiment includes an electrode substrate and a catalyst layer. The catalyst layer includes a catalyst, a hydrophilic ionomer, and a hydrophobic binder.

At least one of the catalyst layers of an anode catalyst and a cathode catalyst includes hydrophilic ionomers and hydrophobic binders as well as the catalyst or catalysts. According to one embodiment, both the anode catalyst layer and the cathode catalyst layer include all three components of catalysts, hydrophilic ionomers, and hydrophobic binders. When the hydrophilic ionomers and hydrophobic binders are included in the cathode catalyst layer, water generated from cell reactions is easily released. When the hydrophilic ionomers and hydrophobic binders are included in the anode catalyst layer, $CO_2$ generated from cell reactions is easily released and fuel can be smoothly supplied. When only one of the anode catalyst layer and the cathode catalyst layer includes hydrophilic ionomers and hydrophobic binders as well as catalysts, the other catalyst layer has a conventional catalyst layer structure.

In the catalyst layer according to one embodiment of the present invention, the sum of the hydrophilic ionomers and hydrophobic binders concentrations is 12 to 16% by weight of the catalysts. When the sum of the concentrations of the hydrophilic ionomers and hydrophobic binders is less than 12% by weight of the catalysts, conductivity may be lower and resistance higher resulting in cell power reduction. When the sum of the concentrations of the hydrophilic ionomers and hydrophobic binders is more than 16% by weight, catalyst efficiency may be reduced.

In one embodiment, the weight ratio of the hydrophilic ionomers to the hydrophobic binders ranges from 50:50 to 99:1. In another embodiment, the weight ratio of the hydrophilic ionomers to the hydrophobic binders ranges from 75:25 to 95:5.

When the relative amount of the hydrophilic ionomers is less than the weight ratio of 50:50 of the hydrophilic ionomers to the hydrophobic binders, conductivity may be lower. Even when the relative amount of the hydrophilic ionomers is more than the weight ratio of 99:1, there is no additional effect.

The hydrophobic binders and catalyst particles may form pores between them, and thereby fuels and oxidants may be efficiently diffused and water generated during the cell reactions may be easily released. Furthermore, $CO_2$ is a product of hydrocarbon fuel combustion and inhibits fuel oxidation reactions, but it, too, is easily released, resulting in improvement of fuel cell performance. Therefore, fuel cells having high power and high efficiency can be produced.

The hydrophobic binder may be a non-electrically conductive material such as polytetrafluoroethylene, polyvinylidene fluoride, or mixtures thereof.

The hydrophilic ionomer includes a proton conductive polymer resin having a cation exchange group as a side chain selected from the group consisting of a sulfonic acid group, a carboxylic acid group, a phosphoric acid group, a phosphonic acid group, and derivatives thereof.

Examples of the polymer resin include, but are not limited to, at least one proton conductive polymer selected from the group consisting of fluorine-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, and polyphenylquinoxaline-based polymers. In one embodiment, the proton conductive polymer is at least one polymer selected from the group consisting of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bis-benzimidazole), and poly (2,5-benzimidazole).

Catalysts included in the catalyst layer may include any catalyst that may catalyze a fuel cell reaction such as a platinum-based catalyst. The platinum-based catalyst may include at least one metal selected from the group consisting of platinum, ruthenium, osmium, platinum-ruthenium alloys, platinum-osmium alloys, platinum-palladium alloys, platinum-M alloys (where M is a transition element selected from the group consisting of Ga, Ti, V, Cr, Mn, Fe, Co, Ni, Cu, Zn, Sn, Mo, W, Rh, and combinations thereof, and combinations thereof. The anode and the cathode may include the same material as the catalyst. However, in the case of a direct oxidation fuel cell, a platinum-ruthenium alloy catalyst may be advantageously used as the anode catalyst in order to prevent catalyst poisoning by CO generated during a fuel cell reaction. More specifically, examples of the platinum-based catalyst are selected from the group consisting of Pt, Pt/Ru, Pt/W, Pt/Ni, Pt/Sn, Pt/Mo, Pt/Pd, Pt/Fe, Pt/Cr, Pt/Co, Pt/Ru/W, Pt/Ru/Mo, Pt/Ru/V, Pt/Fe/Co, Pt/Ru/Rh/Ni, Pt/Ru/Sn/W, and combinations thereof. The catalysts are not limited to those listed.

Such a metal catalyst may be used in the form of a metal itself (black catalyst), or one supported on a carrier. The carrier may include carbon forms such as graphite, denka black, ketjen black, acetylene black, carbon nanotubes, carbon nanofiber, carbon nanowire, carbon nanoballs, or activated carbon, or an inorganic particulate such as alumina, silica, zirconia, or titania. Carbon is generally used.

The electrode substrates of the anode and the cathode support the anode and the cathode, respectively, and provide a path for transferring a fuel and an oxidant to the catalyst layer. In one embodiment, the electrode substrates are formed from a material such as carbon paper, carbon cloth, carbon felt, or a metal cloth (a porous film composed of metal fiber or a metal film disposed on a surface of a cloth composed of polymer fibers). The electrode substrate is not limited thereto.

The electrode substrates may be treated with a fluorine-based resin to be water-repellent to prevent deterioration of diffusion efficiency due to water generated during operation of a fuel cell. The fluorine-based resin may include polyvinylidene fluoride, polytetrafluoroethylene, polyhexafluoro propylene, polyperfluoroalkylvinylether, polyperfluoro sulfonylfluoride alkoxyvinyl ether, fluorinated ethylene propylene, polychlorotrifluoro ethylene, or copolymers thereof. The fluorine-based resin is not limited to these polymers.

A microporous layer may be added between the aforementioned electrode substrates and catalyst layers to increase reactant diffusion effects. The microporous layer generally includes conductive powders with a particular particle diameter. The conductive materials may include, but are not limited to, carbon powder, carbon black, acetylene black, activated carbon, carbon fiber, fullerene, nano-carbon, or combinations thereof. The nano-carbon may include a material such as carbon nanotubes, carbon nanofiber, carbon nanowire, carbon nanohorns, carbon nanorings, or combinations thereof.

The microporous layer is formed by coating a composition including a conductive powder, a binder resin, and a solvent on the conductive substrate. The binder resin may include, but is not limited to, polytetrafluoroethylene, polyvinylidene fluoride, polyhexafluoro propylene, polyperfluoroalkylvinyl ether, polyperfluoro sulfonylfluoride alkoxyvinyl ether, polyvinyl alcohol, cellulose acetate, or copolymers thereof. The solvent may include, but is not limited to; an alcohol such as ethanol, isopropyl alcohol, n-propyl alcohol, butanol, and so on; water; dimethyl acetamide; dimethyl sulfoxide; N-methylpyrrolidone; and tetrahydrofuran. The coating method may include, but is not limited to, screen printing, spray coating, doctor blade methods, gravure coating, dip coating, silk screening, painting, and so on, depending on the viscosity of the composition.

The electrode of the above catalyst layer may be fabricated as follows: a catalyst layer composition is prepared and then the composition is applied to a substrate. The catalyst layer composition may be prepared as follows: catalysts and hydrophilic ionomers are mixed first to dispose the hydrophilic ionomers around the catalysts, and then hydrophobic binders may be added to the resulting mixture to dispose the hydrophobic binders around the hydrophilic ionomers. According to an alternative embodiment, the catalyst and the hydrophobic binders may be mixed first. The mixing order of the catalysts, the hydrophilic ionomers, and the hydrophobic binders is not important.

When a commercial hydrophilic ionomer is used, additional solvent is not required because the commercial hydrophilic ionomer is provided dispersed in a solvent.

The method of preparing a membrane-electrode assembly using such electrodes may include a catalyst layer coated on a substrate (generally, referred to as "CCS procedure") or a catalyst layer coated on a polymer electrolyte membrane (generally, referred to as "CCM procedure"). The CCM procedure may maximize the effect of this aspect of the present invention. Furthermore, in this aspect of the present invention, the necessary concentration gradient of the hydrophobic binder may be obtained by coating a catalyst composition including a catalyst, a hydrophilic ionomer, and a hydrophobic binder, and coating, e.g. by spraying techniques, additional hydrophobic binder solution on the resulting coating layer.

In accordance with the CCM method, the catalyst layer composition is applied on an electrode substrate to fabricate an anode and a cathode, respectively, and then a polymer electrolyte membrane is disposed between the anode and the cathode followed by compressing them together to fabricate a membrane-electrode assembly.

In accordance with the CCM method, the catalyst layer composition is applied on a releasing film to fabricate anode and cathode catalyst layer films, respectively, and then a polymer electrolyte membrane is disposed between the two catalyst layer films followed by compressing them together. Alternatively, the catalyst layer composition may be directly applied on a polymer electrolyte membrane.

The membrane-electrode assembly can include the above electrode as the anode or cathode or both. If the assembly includes both the anode and the cathode, they face each other, and a polymer electrolyte membrane is interposed between the electrodes.

The membrane-electrode assembly may provide a fuel cell having high power and high efficiency. The membrane-electrode assembly may be advantageously applied to a direct oxidation fuel cell.

In the membrane-electrode assembly according to one embodiment, the hydrophobic binders are disposed in a predetermined concentration gradient. That is to say, the hydrophobic binders may be disposed in a concentration gradient where the concentration decreases from a first surface contacting an electrode substrate toward a second surface contacting a polymer electrolyte membrane. In such a concentration gradient, water and $CO_2$ generated from the cell reaction may be efficiently released.

According to one embodiment of the present invention, the concentration of the hydrophobic binders at the first surface contacting the electrode substrate is 5 to 25% higher than that at the second surface contacting the polymer electrolyte membrane.

The proton conductive polymer for the polymer electrolyte membrane of the present invention may be any polymer resin having a cation exchange group selected from the group consisting of a sulfonic acid group, a carboxylic acid group, a phosphoric acid group, a phosphonic acid group, and derivatives thereof, as its side chain.

Examples of the polymer resin include, but are not limited to, at least one proton conductive polymer selected from the group consisting of fluorine-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, and polyphenylquinoxaline-based polymers. In one embodiment, the proton conductive polymer is at least one selected from the group consisting of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bis-benzimidazole), and poly (2,5-benzimidazole).

H may be substituted by Na, K, Li, Cs, or tetrabutylammonium in a proton conductive group of the proton conductive polymer. When H is substituted with Na in an ion exchange group at the terminal end of the proton conductive group, NaOH is used to make the exchange. When H is substituted with tetrabutylammonium, tributylammonium hydroxide is used to make the exchange. K, Li, or Cs may also be substituted with H by using appropriate compounds. Methods of substituting for H are known in the related art, and therefore are not further described in detail.

The structure of the membrane-electrode assembly according to one embodiment of the present invention is shown in FIG. 1. The membrane-electrode assembly 20 includes a polymer electrolyte membrane 25 and a cathode 21 and an anode 22 respectively disposed on each side of the polymer electrolyte membrane 25. At least one of the cathode and the anode includes a hydrophilic ionomer and a hydrophobic binder as well as a catalyst.

A fuel cell system including the membrane-electrode assembly includes at least one electricity generating element, a fuel supply, and an oxidant supply.

The electricity generating element includes a membrane-electrode assembly comprising a polymer electrolyte membrane, a cathode and an anode positioned on opposite sides of the polymer electrolyte membrane, and separators positioned on both sides of the membrane-electrode assembly.

The fuel supply plays the role of supplying the electricity generating element with a fuel such as hydrogen. The fuel includes liquid or gaseous hydrogen; a hydrocarbon-based fuel such as natural gas; or an alcohol such as methanol, ethanol, propanol, or butanol.

Figure 2:
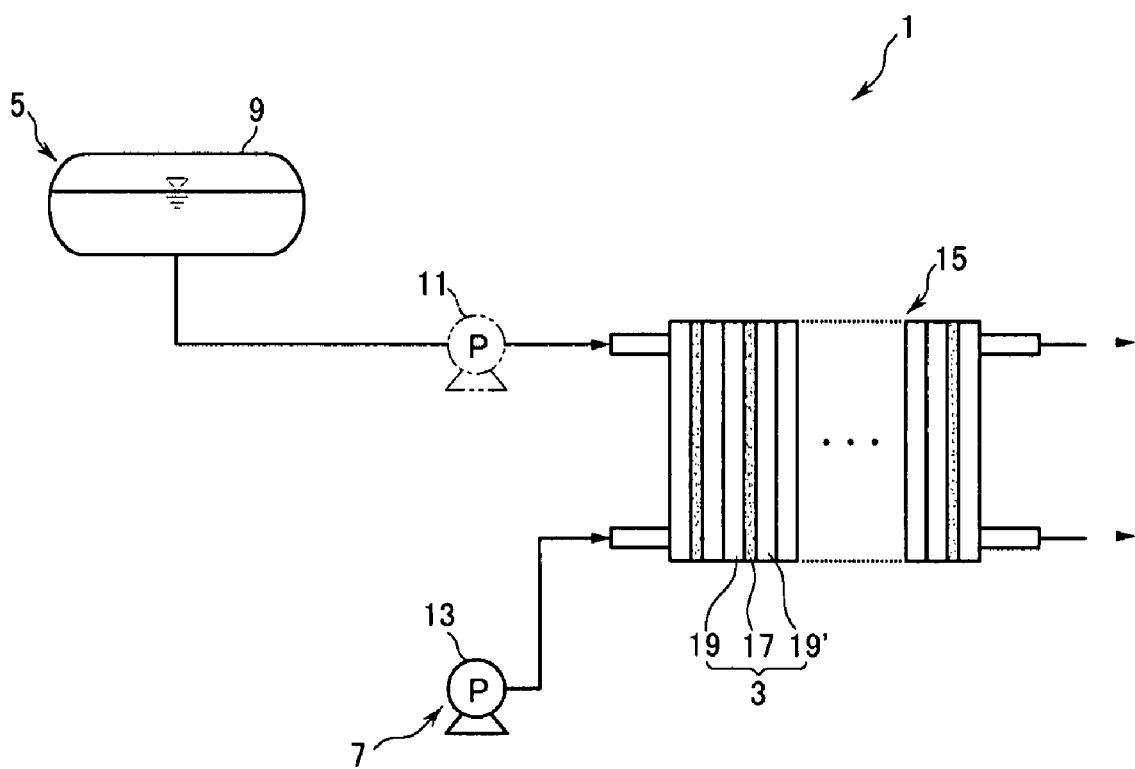
FIG. 2 is a schematic diagram showing the structure of a fuel cell system according to one embodiment of the present invention.

FIG. 2 shows a schematic structure of a fuel cell system 1 that will be described in detail with reference to this drawing as follows. FIG. 2 illustrates a fuel cell system wherein a fuel and an oxidant are provided to the electricity generating element through pumps, but the present invention is not limited to such a structure. The fuel cell system of the present invention alternatively includes a structure wherein a fuel and an oxidant are provided to the fuel cell through diffusion.

The fuel cell system 1 includes at least one electricity generating element 3 that generates electrical energy through an electrochemical reaction of a fuel and an oxidant, a fuel supplier 5 for supplying a fuel to the electricity generating element 3, and an oxidant supplier 7 for supplying an oxidant to the electricity generating element 3.

In addition, the fuel supplier 5 is equipped with a tank 9, which stores fuel, and a fuel pump 11, which is connected therewith. The fuel pump 11 supplies fuel stored in the tank 9 with a predetermined pumping power.

The oxidant supplier 7, which supplies the electricity generating element 3 with an oxidant, is equipped with at least one pump 13 for supplying an oxidant with a predetermined pumping power.

The electricity generating element 3 includes a membrane-electrode assembly 17, which oxidizes hydrogen or a fuel and reduces an oxidant, and separators 19 and 19' that are respectively positioned at opposite sides of the membrane-electrode assembly and supply hydrogen or a fuel, and an oxidant, respectively. At least one electricity generating element 3 constitutes a stack 15.

The following examples illustrate the present invention in more detail. However, it is understood that the present invention is not limited by these examples.

EXAMPLE 1

88 wt % of a Pt—Ru black (Johnson Matthey) catalyst and 12 wt % of a solution of 5 wt % NAFION® (DuPont Company) in water and 2-propanol (NAFION/$H_2$O/2-propanol) (sold by Solution Technology Inc.) were mixed to prepare an anode catalyst composition.

A Pt black (Johnson Matthey) catalyst and 5 wt % NAFION/$H_2$O/2-propanol (Solution Technology Inc.), and polytetrafluoroethylene (PFTE) were mixed to prepare a cathode catalyst composition. The amount of the Pt black was 94 wt % and the amount of the mixed NAFION/$H_2$O/2-propanol and polytetrafluoroethylene was 6 wt %. The weight ratio of the NAFION® to the PTFE was 99:1.

The above anode and cathode catalyst compositions were respectively coated on each side of a commercially available NAFION® 115 (poly(perfluorosulfonic acid)) polymer electrolyte membrane, to begin fabrication of an anode catalyst layer and a cathode catalyst layer. Subsequently, carbon paper for a carbon paper electrode substrate having 0.2 mg/cm$^2$ of carbon content was disposed on the anode catalyst layer and a carbon paper electrode substrate having 1.3 mg/cm$^2$ of carbon content was disposed on the cathode catalyst layer. Then, the composition was hot pressed at 100° C. to fabricate a membrane-electrode assembly. The resulting membrane-electrode assembly was used as a unit cell. In this example, loading amounts of the anode and the cathode were 8 mg/cm$^2$, respectively.

EXAMPLE 2

A membrane-electrode assembly was fabricated by the same method as in Example 1, except that the weight ratio of the NAFION® to the PTFE was 98:2.

EXAMPLE 3

A membrane-electrode assembly was fabricated by the same method as in Example 1, except that the weight ratio of the NAFION® to the PTFE was 95:5.

EXAMPLE 4

A membrane-electrode assembly was fabricated by the same method as in Example 1, except that the weight ratio of the NAFION® to the PTFE was 90:10.

EXAMPLE 5

A membrane-electrode assembly was fabricated by the same method as in Example 1, except that the weight ratio of the NAFION® to the PTFE was 75:25.

EXAMPLE 6

A membrane-electrode assembly was fabricated by the same method as in Example 1, except that the weight ratio of the NAFION® to the PTFE was 70:30.

EXAMPLE 7

A membrane-electrode assembly was fabricated by the same method as in Example 1, except that the weight ratio of the NAFION® to the PTFE was 50:50.

EXAMPLE 8

88 wt % of a Pt—Ru black (Johnson Matthey) catalyst and 12 wt % of a solution of 5 wt % NAFION/$H_2$O/2-propanol (Solution Technology Inc.) were mixed to prepare an anode catalyst composition.

The above anode catalyst composition was coated on a commercially available NAFION® 115 (poly(perfluorosulfonic acid)) polymer electrolyte membrane to fabricate an anode catalyst layer.

A Pt black (Johnson Matthey) catalyst and 5 wt % NAFION/$H_2$O/2-propanol (Solution Technology Inc.), and polytetrafluoroethylene (PFTE) were mixed to prepare a cathode catalyst composition. The amount of the Pt black was 94 wt % and the amount of the mixed NAFION/$H_2$O/2-propanol and polytetrafluoroethylene was 6 wt %. The weight ratio of the NAFION® to the PTFE was 99:1.

The above cathode catalyst composition was coated on the commercially available NAFION® 115 (poly(perfluorosulfonic acid)) polymer electrolyte membrane and a PTFE in isopropyl alcohol solution with a concentration of 0075 wt % was sprayed on the resulting coating layer to fabricate an anode catalyst layer and a cathode catalyst layer.

Subsequently, a carbon paper having 0.2 mg/cm$^2$ of carbon content for a carbon paper electrode substrate was disposed on the anode catalyst layer and a carbon paper electrode substrate having 1.3 mg/cm$^2$ of carbon content was disposed on the cathode catalyst layer. Then, hot-pressing at 100° C. was performed to fabricate a membrane-electrode assembly. The resulting membrane-electrode assembly was used as a unit cell. Herein, loading amounts of the anode and the cathode were 8 mg/cm$^2$, respectively.

In the membrane-electrode assembly, the PTFE binder was included in a concentration gradient where the amount of the hydrophobic binder at the first surface of the cathode catalyst layer contacting the electrode substrate is 25% more than the amount of the hydrophobic binder at the second surface of the cathode catalyst contacting the polymer electrolyte membrane.

COMPARATIVE EXAMPLE 1

A membrane-electrode assembly was fabricated by the same method as in Example 1, except that polytetrafluoroethylene was not used in the cathode catalyst composition.

COMPARATIVE EXAMPLE 2

A membrane-electrode assembly was fabricated by the same method as in Example 1, except that NAFION® was not used in the cathode catalyst composition.

1M methanol and ambient air were introduced with λ, stoichiometry (the ratio of the amount of methanol supplied to anode to the amount of the ambient air supplied to cathode, the theoretical value for electrochemical reaction) of 1. Thereafter, with respect to the fuel cells according to Examples 1 to 7 and Comparative Example 1, power density (mW/cm$^2$) was measured at 0.45 V, 0.4 V, and 0.35 V at 70° C., respectively. The measurement results are shown in the following Table 1.

TABLE 1

| | Weight ratio of the NAFION ® ionomer to PTFE | | | | |
|---|---|---|---|---|---|
| | NAFION ® ionomer | PTFE | 0.45 V | 0.4 V | 0.35 V |
| Comparative Example 1 | 100 | 0 | 110 | 130 | 135 |
| Example 1 | 99 | 1 | 110 | 132 | 137 |
| Example 2 | 99 | 2 | 111 | 132 | 137 |
| Example 3 | 95 | 5 | 113 | 135 | 141 |
| Example 4 | 90 | 10 | 118 | 148 | 163 |
| Example 5 | 75 | 25 | 115 | 140 | 150 |
| Example 6 | 70 | 30 | 107 | 125 | 132 |
| Example 7 | 50 | 50 | 80 | 98 | 115 |

As shown in Table 1, the fuel cell according to Examples 1 to 7 including both a hydrophilic ionomer and a hydrophobic binder shows better power density than that according to Comparative Example 1.

Furthermore, the fuel cell according to Example 8 showed higher power density than Example 1 by 10%.

As described above, the catalyst layer of the membrane-electrode assembly according to one embodiment of the present invention includes hydrophilic ionomers and hydrophobic binders as well as catalysts. Thereby catalyst efficiency is improved, fuel and oxidant supply occurs smoothly, and by-products generated during cell operations are easily released resulting in highly efficient and high power cells.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An electrode for a fuel cell comprising: an electrode substrate; and a catalyst layer, wherein the catalyst layer comprises a catalyst, a hydrophilic ionomer, and a hydrophobic binder, wherein the sum of concentrations of the hydrophilic ionomer and the hydrophobic binder is at 12 or 16 or between 12 and 16% by weight of the catalyst, and the weight ratio of the hydrophilic ionomer to the hydrophobic binder is at 75:25 and 95:5 or between 75:25 and 95:5.

2. The electrode of claim 1, wherein the hydrophobic binder is an electrically non-conductive binder.

3. The electrode of claim 2, wherein the hydrophobic binder is selected from the group of polymers consisting of polytetrafluoroethylene, polyvinylidene fluoride, and combinations thereof.

4. The electrode of claim 1, wherein the hydrophilic ionomer is a proton conductive polymer resin.

5. The electrode of claim 4, wherein the hydrophilic ionomer comprises a proton conductive polymer resin having a cation exchange side chain selected from the group consisting of a sulfonic acid group, a carboxylic acid group, a phosphoric acid group, a phosphonic acid group, and derivatives thereof.

6. The electrode of claim 5, wherein the hydrophilic ionomer comprises at least one proton conductive polymer selected from the group consisting of fluorine-based polymers, benzimidazole-based polymers, polyimide-based polymers, polyetherimide-based polymers, polyphenylenesulfide-based polymers, polysulfone-based polymers, polyethersulfone-based polymers, polyetherketone-based polymers, polyether-etherketone-based polymers, polyphenylquinoxaline-based polymers, and combinations thereof.

7. The electrode of claim 5, wherein the hydrophilic ionomer comprises at least one proton conductive polymer selected from the group consisting of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bis-benzimidazole), poly (2,5-benzimidazole), and combinations thereof.

8. A membrane-electrode assembly for a fuel cell, comprising:
an anode and a cathode facing each other; and
a polymer electrolyte membrane interposed between the anode and the cathode, wherein at least one of the anode or cathode comprises an electrode substrate and a catalyst layer comprising a catalyst, a hydrophilic ionomer, and a hydrophobic binder, and wherein the sum of concentrations of the hydrophilic ionomer and the hydrophobic binder is at 12 or 16 or between 12 and 16% by weight of the catalyst, and the weight ratio of the hydrophilic ionomer to the hydrophobic binder is at 75:25 or 95:5 or between 75:25 and 95:5.

9. The membrane-electrode assembly of claim 8, wherein the hydrophobic binder concentration comprises a gradient where the concentration of the hydrophobic binder decreases from a first surface of the catalyst layer contacting the electrode substrate toward a second surface of the catalyst layer contacting the polymer electrolyte membrane.

10. The membrane-electrode assembly of claim 9, wherein the concentration of the hydrophobic binder at the first surface is 5 to 25% more than the concentration of the hydrophobic binder at the second surface.

11. The membrane-electrode assembly of claim 8, wherein the hydrophobic binder is an electrically non-conductive binder.

12. The membrane-electrode assembly of claim 11, wherein the hydrophobic binder is selected from the group of polymers consisting of polytetrafluoroethylene, polyvinylidene fluoride, and combinations thereof.

13. The membrane-electrode assembly of claim 8, wherein the hydrophilic ionomer is a proton conductive polymer resin.

14. The membrane-electrode assembly of claim 8, wherein the catalyst layer is coated on the polymer electrolyte membrane.

15. The membrane-electrode assembly of claim 14, wherein the membrane-electrode assembly is used in a direct oxidation fuel cell.

16. A fuel cell system comprising:
- at least one electricity generating element configured to generate electrical energy through an electrochemical reaction of a fuel and an oxidant; and comprises a membrane-electrode assembly for a fuel cell, the membrane-electrode assembly comprising an anode and a cathode facing each other and a polymer electrolyte membrane interposed between the anode and the cathode, wherein at least one of the anode or the cathode comprises an electrode substrate and a catalyst layer, wherein the catalyst layer comprises a catalyst, a hydrophilic ionomer, and a hydrophobic binder;
- a fuel supplier for supplying a fuel to the electricity generating element; and
- an oxidant supplier for supplying an oxidant to the electricity generating element, wherein the sum of concentrations of the hydrophilic ionomer and the hydrophobic binder is at 12 or 16% or between 12 and 16% by weight of the catalyst, and the weight ratio of the hydrophilic ionomer to the hydrophobic binder is at 75:25 or 95:5 or between 75:25 and 95:5.

17. The fuel cell system of claim 16, wherein the hydrophobic binder comprises a gradient where the concentration of the hydrophobic binder decreases from a first surface of the catalyst layer contacting the electrode substrate toward a second surface of the catalyst layer contacting the polymer electrolyte membrane.

18. The fuel cell system of claim 17, wherein the concentration of the hydrophobic binder at the first surface is 5 to 25% more than the concentration of the hydrophobic binder at the second surface.

19. The fuel cell system of claim 16, wherein the hydrophobic binder is an electrically non-conductive binder.

20. The fuel cell system of claim 19, wherein the hydrophobic binder is selected from the group of polymers consisting of polytetrafluoroethylene, polyvinylidene fluoride, and combinations thereof.

21. The fuel cell system of claim 16, wherein the hydrophilic ionomer is a proton conductive polymer resin.

22. The fuel cell system of claim 16, wherein the catalyst layer is coated on the polymer electrolyte membrane.

23. The fuel cell system of claim 16, wherein the fuel cell system is used in a direct oxidation fuel cell.

* * * * *